United States Patent [19]

Meyer

[11] 4,403,330

[45] Sep. 6, 1983

[54] REGENERATIVE REPEATER FOR MULTI-STAGE DIGITAL SIGNALS

[75] Inventor: Fritz Meyer, Germering, Fed. Rep. of Germany

[73] Assignee: Siemens Aktiengesellschaft, Berlin & Munich, Fed. Rep. of Germany

[21] Appl. No.: 281,904

[22] Filed: Jul. 9, 1981

[30] Foreign Application Priority Data

Aug. 8, 1980 [DE] Fed. Rep. of Germany ....... 3030172

[51] Int. Cl.³ .......................................... H04L 25/66
[52] U.S. Cl. .................................. 375/4; 307/272 A; 328/164
[58] Field of Search .................. 307/260, 268, 272 R, 307/272 A; 328/164; 330/207, 251, 252, 295, 299, 307; 375/4, 17

[56] References Cited

U.S. PATENT DOCUMENTS 4,224,534 9/1980 Gordon .............................. 328/164
4,289,979 9/1981 Muller ............................ 307/272 A

FOREIGN PATENT DOCUMENTS 2833267 7/1979 Fed. Rep. of Germany .
2827958 9/1979 Fed. Rep. of Germany .

Primary Examiner—Benedict V. Safourek
Attorney, Agent, or Firm—Hill, Van Santen, Steadman & Simpson

[57] ABSTRACT

A regenerative repeater provides amplitude and sequence control of an n-stage digital signal having a high transmission rate with at least one clock pulse driven D flip-flop and a differential amplifier arrangement having n-1 threshold voltages. The arrangement is characterized in that the threshold voltages of the differential amplifier arrangement are capable of being switched over by 1d (n-1) binary control signals and for this purpose a multi-emitter transistor having at least n-1 emitter terminals is provided and has a base terminal, connected with the signal input, and with a bias voltage source. In the case of three of more control signals, the common emitter terminals of the control signal differential amplifiers, activated by the latter, are connected with the collector terminals of the transistors of the next-lower control signal differential amplifier. The collector terminals of the n-1 control signal differential amplifiers, activated by the highest control signal, are respectively connected with the emitter terminals of the multi-emitter transistor.

5 Claims, 5 Drawing Figures

REGENERATIVE REPEATER FOR MULTI-STAGE DIGITAL SIGNALS

BACKGROUND OF THE INVENTION

1. Field of the Invention

The present invention relates to a regenerative repeater, and more particularly to a regenerative repeater for amplitude control and chronological control of an n stage digital signal having a high transmission speed with at least one clock D flip-flop and a differential amplifier having n−1 threshold voltages.

2. Description of the Prior Art

Through the combination of digital time-division multiplex signals of a low hierarchial stage, and hence of a slower transmission speed, into such of a higher hierarchial stage, and through the introduction of digital message switching technology, the necessity arises of constructing transmission paths with a very high data signaling rate. Transmission paths of this type have data signaling rates in the range of several hundred M Baud, corresponding to a CCITT recommendation, in particular, such as 565 M Baud. Because of the rather high cable attenuation at these frequencies, it is necessary to introduce into the transmission path, at comparatively small intervals, regenerative repeaters for regenerating the transmitted signal, whereby considerable requirements are made of such repeaters with respect to the signal processing speed. In order to increase the transmission capacity with the same transmission speed, use is made of the possibility of transmitting multi-stage signals instead of binary signals. In the case of the transmission of multi-stage signals, the requirements made of regenerative repeaters further increase; in view of the difficulties in realizing multilevel logic circuits, a regeneration method has proven successful in which the multi-stage signals are converted into unipolar pulse trains and the latter are respectively separately regenerated.

Regenerators for the amplitude and chronological regeneration of multi-stage digital signals are known in the art. From the German published application 28 27 958, a regenerative repeater for multi-stage digital signals at a high transmission speed—present in a partial-response code—is known. This regenerative repeater contains, at the input side, a level switch with a sampling stage by means of which the signals arising are divided into respectively two pulse trains having different amplitude ranges, and, moreover, a chronological regeneration is performed. For the purpose of amplitude decision, the two signal parts are separated into binary signals which are regenerated according to amplitude in the individual stages of an amplitude decision element containing tunnel diodes. From the German published application No. 28 33 267 a method is also known for regenerating a multi-stage digital signal having components occurring in the GHz range, and a corresponding regenerative repeater. The regenerative repeater contains a special bistable flip-flop, equipped with tunnel diodes, to which the signal to be regenerated is supplied with such an amplitude that only upon occurrence of a set pulse does a switch over of the bistable flip-flop take place. For multi-stage digital signals, several bistable flip-flops of this type, which are respectively effective in a different amplitude range, are connected in parallel.

The above-mentioned regenerative repeaters offer the possibility of regenerating digital signals with a plurality of, for example, seven, amplitude levels. The expense required for this purpose is not justified in the case of regeneration of four-level digital signals; moreover, a greater number of circuit elements also requires an altogether higher operating current; and, in addition, a higher signal transit time can result.

After completed regeneration, the individual signal portions, for example by way of an assessed addition, are joined together to form a new signal.

In an earlier patent application, a regenerative repeater is disclosed for the purpose of amplitude regeneration and chronological regeneration of a quaternary pulse code modulated (PCM) signal having a high transmission rate, and for the purpose of its conversion into two PCM signals present in a binary code which is as redundancy-poor as possible, in particular, the dual code. This regenerative repeater is characterized in that there is connected, with a connection for the quaternary signals to be regenerated, a signal input of a first differential amplifier, whose signal output is connected to the D input of a first clocked D flip-flop, that there is, moreover, connected with the output terminal for the quaternary signals, the input of a first delay arrangement having a delay time corresponding to the signal transit time through the first differential amplifier and the first D flip-flop. The signal input of a second differential amplifier is connected to the output of the first delay arrangement, the second differential amplifier having a reference voltage input which is connected with a reference voltage source and a Q output of the first D flip-flop. This Q output, moreover, by way of a second delay arrangement having a delay time corresponding to the signal transit time through the second differential amplifier and the second D flip-flop, is connected with an output for a first binary signal. The Q output of the second D flip-flop is connected with an output for a second binary signal. Therefore, this solution is limited to the regeneration of quaternary signals.

SUMMARY OF THE INVENTION

The object of the present invention is to provide for amplitude and chronological regeneration of an n-stage digital signal, where n is a random integer greater than 2.

According to the invention, the above object is achieved in that the threshold voltages of the differential amplifier arrangements are capable of being switched over by means of ld(n−1) control signals (S1, S2), and, that for this purpose, a multi-emitter transistor having at least n−1 emitter terminals, a base terminal connected with the signal input and possibly a bias voltage source, and a collector terminal, connected with a reference potential, is provided. Each of the n−1emitter terminals is respectively separately connected with the emitter terminal of one of n−1 transistors, so that n−1 differential amplifiers result. The base terminals of the n−1 transistors are respectively separately connected with one of n−1 sources for the threshold voltages. The collector terminals of these transistors are connected with one another, with an output terminal, and, via a resistor, with a reference potential. The signal input of a first control signal differential amplifier is connected with one input for the first control signal. The signal inputs of a third control signal differential amplifier and a fourth control signal differential amplifier are connected with one input for the second control signal. The number of control signal differential amplifiers, connected with the signal inputs of additional control signals, doubles respectively up to the maximum number (n−1)/2 of the control signal differential amplifiers connected with a control signal input. The common emitter terminal of the first control signal differential amplifier is connected, via a comparatively high-impedance resistor, with an operating voltage. The reference voltage input of this differential amplifier is connected with a source for a first reference signal. The reference voltage inputs of the additional control signal differential amplifiers, respectively connected with one single control input, are connected with one another and with sources for additional reference voltages. Each additional reference voltage exhibits a more positive level than the preceding reference voltage. There are connected, with the collector terminals of the transistors, forming the first control signal differential amplifier, separately and respectively, the emitter terminal points of the third or of the fourth control signal differential amplifier, respectively. Correspondingly, in the case of three or more control signals, the common emitter terminals of the control signal differential amplifiers activated by the latter, are connected with the collector terminals of the next-lower control signal differential amplifiers. The collector terminals of the n−1 control signal differential amplifiers, activated by the highest control signal, are respectively separately connected with the emitter terminals of the multi-emitter transistor.

The invention here advantageously makes use of the possibility of significantly reducing the expense through switching-over a decider stage and through combining several differential amplifiers by means of a multi-emitter transistor. The regenerative repeater arrangement according to the present invention, because of its comprehensive and simple construction, and because of the ease of integration, is surprisingly advantageously utilizable also in the case of regeneration of multi-level digital signals having transmission speeds of below 100 M Baud.

According to a particular embodiment of the invention, a specific solution for three-level digital signals is disclosed.

According to another embodiment of the invention, a solution for a five-level digital signal is provided.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

The repeater according to the state of the art comprises a differential amplifier and a clocked D flip-flop FF connected to the output of the differential amplifier. At the Q output of the flip-flop FF a terminal A is provided for the amplitude and chronologically regenerated signal.

Figure 1:
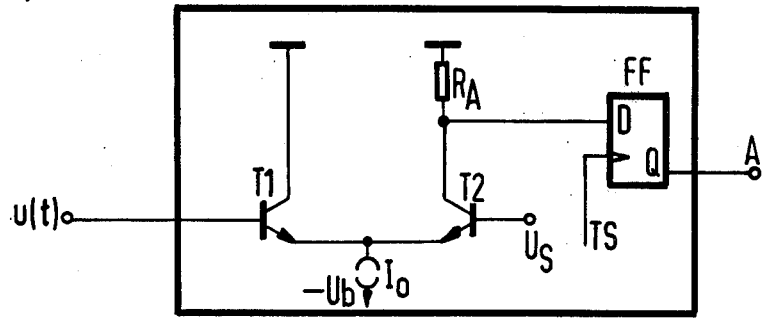
FIG. 1 is a schematic circuit diagram of a prior are regenerative repeater for binary signals.

Differential amplifiers having emitter coupling comprise, in a known manner, two transistor amplifier stages T1, T2 whereby, corresponding to FIG. 1, the emitter terminals of the transistors are connected with one another and, via a current source, with an operating voltage. The current source is realized by a high-impedance resistor. The base terminal of one of the two transistors serves as a signal input u(t), whereas there is connected, to the base terminal of the other transistor, a reference voltage $U_s$ having a magnitude between the maximum and minimum signal levels so that, in the case of connection of the minimum signal amplitude at the signal input, the input transistor is disconnected and the transistor connected to the reference voltage source carries current. Upon exceeding the reference voltage through the input signal voltage, the input transistor becomes conductive and the transistor connected to the reference voltage becomes blocked, so that, in this case, the output signals alternate at the collector terminals. The reference voltage therefore represents a threshold voltage for the differential amplifier; the input transistor conducts only upon the input signal exceeding the threshold voltage.

In the case of occurrence of pulses with more amplitude levels—for example, three—the number of threshold voltages which is lower by one—i.e. two threshold voltages—is necessary. It is now possible to provide, for each of these thresholds, a differential amplifier having a D flip-flop according to FIG. 1, so that a number of differential amplifiers, corresponding to the number of threshold voltages, is provided with a parallel input connection. At the output of each of the differential amplifiers, a pulse appears when the respective threshold has been exceeded; therefore, in the case of two threshold voltages, two binary pulse trains result at the output. The separation and amplitude decision of pulses having several amplitude levels by means of such combined differential amplifiers has particular significance in the case of amplitude decision in pulse regenerative repeaters for multi-level digital signals. The D flip-flop FF contains the clock pulse signal TS corresponding to the transmission speed of the signals regenerated according to amplitude by the differential amplifier. The differential amplifier and flip-flop together form a decider element.

Figure 2:
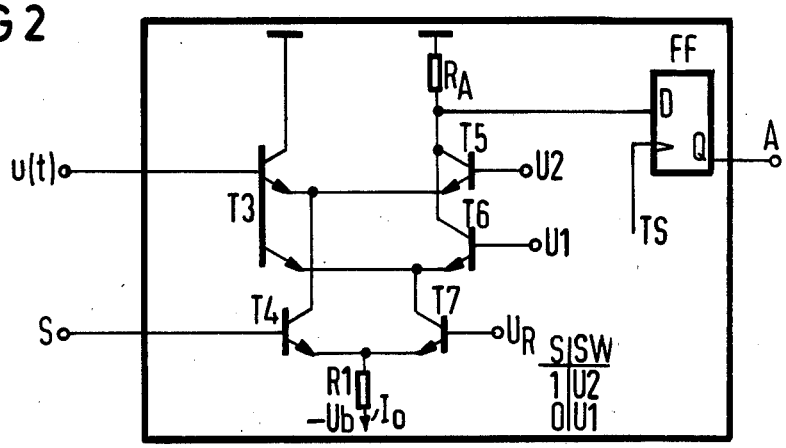
FIG. 2 is a schematic circuit diagram of a regenerative repeater constructed in accordance with the present invention and having two threshold voltages.

The repeater arrangement illustrated in FIG. 2 and comprising a decider element is capable of being switched over by a control signal S between the two threshold values U1 and U2. The decider element contains a first multi-emitter transistor T3 whose base terminal is connected with the terminal for input signals u(t) and whose collector terminal is connected to a reference potential. The first multi-emitter transistor T3 contains two separate emitter terminals, whereby the first emitter terminal is connected with the collector terminal of a fourth transistor T4 and with the emitter terminal of a fifth transistor T5. The second emitter terminal of the multi-emitter transistor is directly connected with the emitter terminal of a sixth transistor T6 and with the collector terminal of the seventh transistor T7. The emitter terminals of the fourth transistor T4 and of the seventh transistor T7 are connected to one another and, via a first resistor T1, with an operating voltage source, whereby the first resistor R1 is so highly resistive that, via the latter, a current $I_o$ is impressed which is virtually independent of the switching states of the repeater. The base terminal of the fourth transistor is connected with an input terminal for receiving a control signal S for the purpose of switching over the threshold values, whereas the base terminal of the second transistor T7 is connected with a terminal for a reference voltage $U_R$. This reference voltage is between the minimum value and the maximum value of the control signal S. Connected with the base terminals of the fifth transistor T5 and the sixth transistor T6 are terminals for the threshold voltage U2 and U1, respectively, whereas the collector terminals of these transistors are connected with one another with the D input of the D flip-flop FF, and, via an output resistor $R_A$, with a reference potential. The Q output of the D flip-flop is connected to the regenerative repeater output A.

In dependence upon the connected control signal, either the transistor T4 or the transistor T7 of the differential amplifier arrangement is conductive. If the minimum level of the control signal—corresponding to the logic "0" level—is connected to the base terminal of the transistor T4, then the transistor T7 is conductive and, hence, the differential amplifier formed from the transistors T3 and T6, is switched on. In this case, therefore, the threshold voltage U1 is effective and the amplitude of the input signal u(t) generates an output signal which is different from the logic "0" level when this amplitude exeeds the threshold voltage U1. Upon connection of a control signal—corresponding to the logic "1" level—to the base terminal of the transistor T4, the transistor T4 becomes conductive, and the differential amplifier formed from the transistor T3 and the transistor T5 is switched on. In this case, an output signal—different from the logic "0" level—is generated when the input voltage u(t) exceeds the threshold voltage U2.

Figure 3:
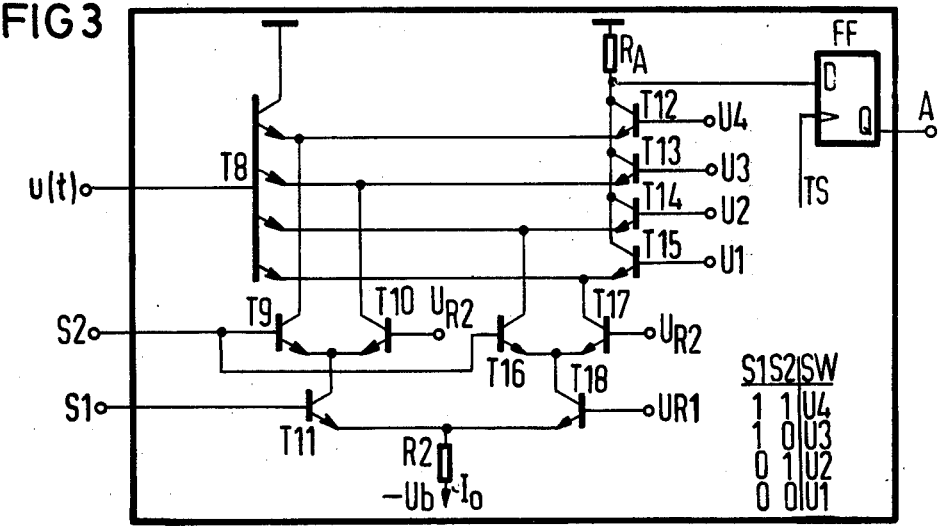
FIG. 3 is a schematic circuit diagram of a regenerative repeater constructed in accordance with the present invention and having four threshold voltages.

The regenerative repeater according to FIG. 3 contains four switchable threshold voltages U1, U2, U3 and U4; and in view of the utilization of binary control signals, accordingly, two control signals S1 and S2 are necessary. The differential amplifier arrangement according to FIG. 3 comprises a multi-emitter transistor T8 having four emitter terminals, which has its base connected to the signal input u(t), whereby the first emitter terminal is connected with the collector terminal of a ninth transistor T9 and with the emitter terminal of a twelfth transistor T12. The second emitter terminal is connected with the collector terminal of a tenth transistor T10 and with the emitter terminal of a thirteenth transistor T13. The third emitter terminal is connected with the collector terminal of a sixteenth transistor T16 and the emitter terminal of a fourteenth transistor T14. The fourth emitter terminal is connected with the collector terminal of a seventeenth transistor T17 and with the emitter terminal of a fifteenth transistor T15. The emitter terminals of the ninth transistor T9 and the tenth transistor T10 are connected with one another and with the collector terminal of an eleventh transistor T11. Correspondingly, the emitter terminals of the sixteenth and seventeenth transistors T16, T17, are connected with one another and with the collector terminal of the eighteenth transistor T18. The emitter terminals of the eleventh transistor T11 and the eighteenth transistor T18 are, in turn, connected with one another and, via a second resistor R2, with an operating voltage terminal $-U_b$. The terminal for the first control signal S1 is connected to the base terminal of the transistor T11, whereas the terminal for the second control signal S2 is connected with the base terminals of the transistors T9 and T16. The base terminal of the eighteenth transistor T18 is connected to a source for a first reference voltage $U_{R1}$, whereas the base terminals of the tenth transistor T10 and of the seventeenth transistor T17 are connected with a source for a second reference voltage $U_{R2}$, where the second reference voltage is more positive than the first reference voltage. The base terminals of the twelfth transistor T12, the thirteenth transistor T13, the fourteenth transistor T14 and the fifteenth transistor T15 are respectively separately connected with terminals of sources for respective threshold voltages U4, U3, U2 and U1, where these threshold voltages likewise exhibit, proceeding from the voltage U1, respectively more positive values, and are generated, for example, by way of a voltage divider. The collector terminals of the transistors T12–T15 are connected with one another and, via a terminating resistor $R_A$, with a reference potential as well as with the D input of the D flip-flop.

The operation of the repeater of FIG. 3 corresponds, taking into account the larger number of threshold voltages and control signals, to that of the regenerator of FIG. 2. Under the assumption that, in the case of both control signals, the minimum value corresponding to the logic "0" level is connected, the transistors T18 and T17 are conductive, and hence the differential amplifier formed from the transistor T8 and the transistor T15 is switched on so that the threshold voltage U1 is effective. If, proceeding from this state, the second control signal alternates from the logic "0" level to the logic "1" level, whereby this level exceeds the second reference voltage $U_{R2}$, then, instead of the transistor T17, the transistor T16 is switched on, so that the differential amplifier formed from the transistor T8 and the transistor T14, and hence the second threshold voltage U2, are effective.

If the control signal S1 alternates from the logic "0" level to the logic "1" level, and thus exeeds the first reference voltage $U_{R1}$, whereas the second control signal S2 remains at the logic "0" level, then the transistor T11 and the transistor T10 are switched conductive. Therefore, the differential amplifier formed from the transistor T8 and the transistor T13 is switched on and hence the threshold voltage U3 for the input signal u(t) is effective. Correspondingly, in the case of occurrence of the logic "1" level at the terminals for the control signals S1 and S2, the transistor T11 and the transistor T9 are rendered conductive. Therefore, the differential amplifier formed from the transistor T8 and the transistor T12 is switched on, so that, in this case, the fourth threshold voltage U4 is effective.

The generation of the binary control signals proceeds for a differential amplifier arrangement with a flip-flop according to FIG. 2 by way of a differential amplifier according to FIG. 1, whereby a threshold voltage $U_S$ must have a value between the threshold voltages U1 and U2 of the differential amplifier according to FIG. 2. Correspondingly, the control signals S1 and S2 for the differential amplifier of FIG. 3 can be generated by two differential amplifiers according to FIG. 1.

Figure 4:
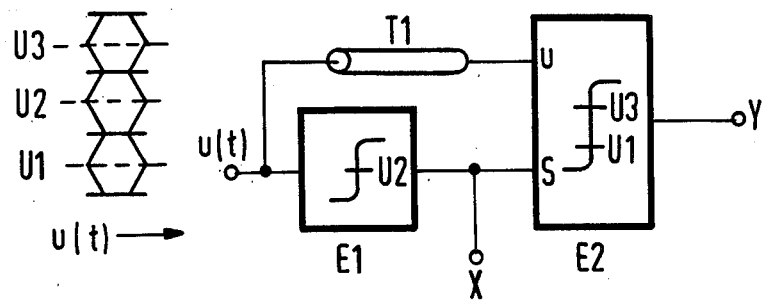
FIG. 4 is a schematic diagram of a regenerative repeater constructed in accordance with the present invention including a combination of the arrangements illustrated in FIGS. 1 and 2.

FIG. 4 illustrates a complete regenerative repeater for a four-level digital signal with the three threshold voltages U1, U2 and U3 which are further illustrated in the left portion of FIG. 4 in the form of the well-known eye diagram. The first decider element E1 is here adjusted to the mean threshold voltage U2, which corresponds to the arrangement of FIG. 1. The threshold voltages U1 and U3 are the switching thresholds of the second decider element E2, which corresponds to the arrangement of FIG. 2. The signal input of the first decider element is directly connected with the input for the signal u(t) to be regenerated, whereas in the input of the second decider element E2 is connected, via a first time delay element T1, to the signal input u(t). In view of the high transmission speeds occurring in the exemplary embodiment, the utilization of a delay line in the time delay element T1 has proven expedient. The delay time of the pulses through the delay line here corresponds to the pulse transit time through the first decider element E1.

In order to explain the method of operation of the regenerative repeater of FIG. 4, let it be first assumed that a pulse having an amplitude slightly above the first threshold voltage U1, but below the second threshold voltage U2, is received. In this case, the first decider element E1 remains in its starting condition; the logic "0" level is connected to its output, and hence to the output for the first of the two regenerated partial signals X, Y; and a control signal S to the second decider element E2 is not emitted. After passing through the delay line T1, i.e. approximately after a bit period, the second decider element E2 is switched over by the input signal, since its first threshold voltage U1 is exceeded. Thus, at the output of this decider element, the pulse with the logic "1" level is emitted, so that the outputs X, Y, which, in the idle state, respectively correspond to the logic "0" level, now have assumed the logic levels "0" and "1".

In the case of reception of the pulse with an amplitude slightly above the second threshold voltage U2, the first decider element E1 is immediately switched over and emits to its output a signal corresponding to the logic "1" level. This signal serves as a control signal S for the second decider element E2, whereby the latter is switched over by the threshold voltage U1 to the threshold voltage U3. As a consequence of this, no switch over of the second decider element by the input signal takes place, since the latter does not exceed the threshold voltage U3. The output level of the second decider element E2 therefore remains at the "0" level.

In the case of receipt of a pulse having an amplitude which exceeds the third threshold voltage U3, a first switching of the first decider element E1 takes place, and after approximately one bit period, also a switching of the second decider element E2 takes place. Therefore, in this case, at the two output X and Y, respectively, a pulse corresponding to the logic "1" level is respectively emitted.

Figure 5:
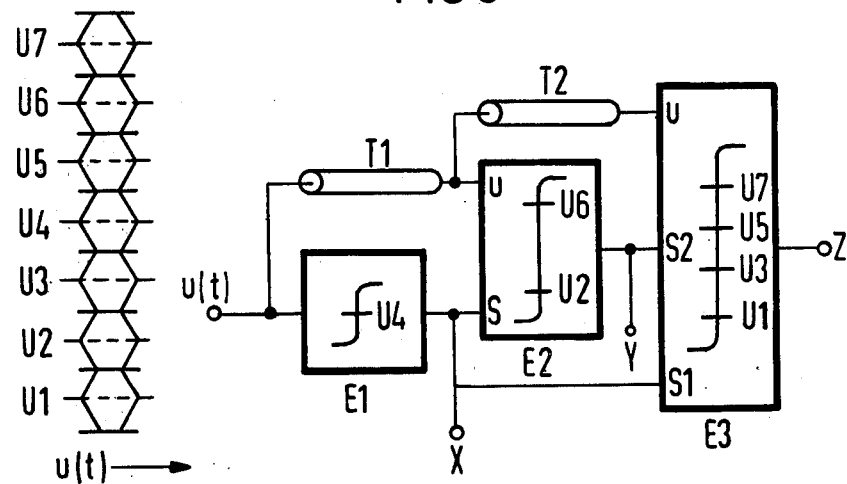
FIG. 5 is a schematic illustration of a regenerative repeater which includes a combination of the arrangements illustrated in FIGS. 1, 2 and 3.

FIG. 5 illustrates a regenerative repeater for an eight-level digital signal, this repeater representing an expansion of the regenerative repeater according to FIG. 4 by the decider element according to FIG. 3.

The individual threshold voltages of the decider elements E1, E2 and E3 are entered into the deciders, whereby the first decider element E1, in turn, is adjusted to the mean threshold voltage of the regenerative repeater. Corresponding to FIG. 5, this is the threshold voltage U4. The remaining threshold voltages are thereby separated into a first group U1, U2 and U3 and a second group U5, U6 and U7. The decider element E2 is now analogously adjusted to the mean threshold voltages U2 and U6 of these two groups. The remaining threshold voltages are contained in the third decider element U3. The generation of the control signals occurs respectively by the series-connected decider elements. Whereas the signal input of the first decider element E1 is directly connected with the signal input u(t) for signals to be regenerated, the signal input of the second decider element E2 is connected to the signal input by way of a first delay line T1. The signal input of the third decider element E3 could likewise be connected to the input for the signal to be regenerated; in this case, the transit time through the corresponding delay element would have to correspond to the pulse transit time through the decider elements E1 and E2. In the present case, the signal input of the third decider element E3 is connected, via a second delay line T2, to the signal input of the second decider element E2. The delay time T2 has only one delay corresponding to the signal transit time through the second decider element E2.

At the output of the first decider element E1, a first regenerated output signal X can be removed, which signal simultaneously represents the control signal S for the second decider element E2 and the control signal S1 for the third decider element E3. At the output of the second decider element E2, a regenerated output signal Y can be removed, which simultaneously serves as the control signal S2 for the third decider element E3. At the output of the third decider element E3, a regenerated output signal Z can be removed.

In order to explain the operation of the arrangement according to FIG. 5, let it first be assumed that only interfering signals are received at the signal input which do not exeed the first threshold voltage U1. In this case, the logic "0" level is provided at the outputs of all three decider elements.

In the case of receipt of an input signal having an amplitude slightly exeeding the first threshold voltage U1, the decider elements E1 and E2 remain in their initial states, whereas the decider element E3, after approximately two bit periods, is switched over by the input signal and emits an output signal Z corresponding to the logic "1" level. In the case of receipt of a pulse having an amplitude slightly above the second threshold voltage U2, after approximately one bit, the second decider element E2 is switched over and emits an output signal Y corresponding to the logic "1" level. This signal, moreover, brings about a switching from the threshold value U1 to the threshold value U3 in the third decider element, so that the latter is not switched by the input signal. Only in the case of receipt of a pulse having an amplitude exceeding third threshold voltage U3, is, in addition to the second decider element E2, also the third decider element E3 switched. In the case of receipt of a pulse slightly exceeding the fourth threshold voltage U4, finally, also the first decider element is switched. As a consequence of this, for the first time, there appears, in the output signal X and in the control signals S and S1, a pulse with a logic "1" level. Through the latter, moreover, a switching of the second decider element from the threshold value U2 to the threshold value U6 takes place, and a switching of the third decider element from the threshold voltage U3 to the threshold voltage U5 takes place. Brought about by this switching, the second decider element and the third decider element do not emit output signals. If the amplitude of an input pulse slightly exceeds the fifth threshold voltage U5, then, in addition to the first decider E1, also the third decider element E3 is switched. In the case of receipt of a pulse having an amplitude slightly above the sixth threshold voltage U6, in addition to the first decider element, also the second decider element is switched, in spite of switching from the threshold voltage U2 to the threshold voltage U6. This decider element thereby emits a second control signal S2 which switches the threshold voltage in the third decider element from the threshold voltage U5 to the threshold voltage U7. If, finally, a pulse is received having an amplitude which exceeds the seventh threshold voltage U7, then a signal is emitted by all three decider elements E1, E2 and E3 which corresponds to the logic "1" level.

Through combination of corresponding decider elements, it is possible, in an analogous fashion, to also realize regenerative repeaters for signals having other amplitude levels than those which have been explained herein.

Although I have described my invention by reference to particular illustrative embodiments, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A regenerative repeater for regenerating an n-level digital signal, comprising:
    a signal input for receiving an n-level digital signal;
    an output;
    a clocked D flip-flop including a clock input, a D input, and a Q output connected to said output;
    a multi-emitter first transistor including a collector connected to a reference potential, a base connected to said signal input and $n-1$ emitters;
    a first resistor connected to the reference potential and to said D input;
    $n-1$ second transistors each including a collector connected to said first resistor and to said D input, a base connected to a respective different threshold potential, and an emitter connected to a respective one of the $n-1$ emitters and forming therewith $n-1$ respective amplitude decision differential amplifiers for the input signal;
    a second resistor connected to an operating potential; and control means including at least one binary control signal differential amplifier connected to the emitters of the transistors of said $n-1$ differential amplifiers in an hierarchal circuit arrangement, at least one control reference input and at least one control signal input for each control signal differential amplifier, the number of control signal differential amplifiers connected to amplitude decision differential amplifiers being $(n-1)/2$, the number of control signal differential amplifiers of the next-lower hierarchy stage being $(n-1)/4$ and decreasing correspondingly until the lowest hierarchy stage contains a single control signal differential amplifier, each of said control signal differential amplifiers including a pair of third transistors each including a base, for receiving the control and control reference signals, respectively, and an emitter connected to the like emitter of the other and a collector,
    said collectors of said transistors of said control signal differential amplifier of the lower hierarchy stage being respectively connected with the emitters of said transistors of the control signal differential amplifier of the next-higher hierarchy stage,
    the collectors of the differential amplifier activated by the highest order control signal respectively connected to the emitters of the amplitude decision differential amplifiers and the emitters of the control differential amplifier activated by the lowest order control signal connected to the operating potential via said second resistor.

2. The regenerative repeater of claim 1, for three-level digital signals, wherein:
    n is three;
    said first transistor includes two emitters; the number $n-1$ of said second transistors is two; and said control means comprises one control differential amplifier whereby the highest and lowest order binary control signals is a single binary control signal.

3. The regenerative repeater of claim 1, for five-level digital signals, wherein:
    n is five;
    said first transistor includes four emitters; the number $n-1$ of said second transistors is four; and
    said control means comprises three control differential amplifiers whereby the highest order binary control signal is connected to two control differential amplifiers and the lowest order binary control signal is connected to one control differential amplifier.

4. A regenerative repeater of claim 1, and further comprising:
    for generating a control signal, an additional differential amplifier having a reference voltage level between the threshold voltage levels of the control differential amplifier to be activated by the control signal and an input connected to said input of said regenerative repeater;
    an input terminal; and
    a delay element connected between said input terminal and said input of said repeater to delay the input signal for an interval equal to the signal transit time of said additional differential amplifier.

5. The regenerative repeater of claim 4, and further comprising:
    an additional clocked D flip-flop connected to said additional differential amplifier and including an output for the control signal;
    said additional differential amplifier and said D flip-flop forming a decision circuit for regeneration of signals exceeding its reference voltage level, said regenerated signals also constituting said control signal.

* * * * *